(12) United States Patent
Ogawa et al.

(10) Patent No.: US 10,997,085 B2
(45) Date of Patent: May 4, 2021

(54) COMPRESSION FOR FLASH TRANSLATION LAYER

(71) Applicant: INTERNATIONAL BUSINESS MACHINES CORPORATION, Armonk, NY (US)

(72) Inventors: Eri Ogawa, Saitama-ken (JP); Takanori Ueda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 16/429,880

(22) Filed: Jun. 3, 2019

(65) Prior Publication Data
US 2020/0379918 A1  Dec. 3, 2020

(51) Int. Cl.
*G06F 12/1018* (2016.01)
*G06F 12/02* (2006.01)

(52) U.S. Cl.
CPC ...... *G06F 12/1018* (2013.01); *G06F 12/0246* (2013.01); *G06F 2212/7201* (2013.01)

(58) Field of Classification Search
CPC .............. G06F 12/1018; G06F 12/0246; G06F 2212/7201
See application file for complete search history.

(56) References Cited

U.S. PATENT DOCUMENTS

| 5,754,819 A | * | 5/1998 | Lynch | ................. G06F 12/0864 |
|---|---|---|---|---|
| | | | | 711/202 |
| 2007/0079106 A1 | * | 4/2007 | Davis | ................. G06F 12/1018 |
| | | | | 711/203 |
| 2007/0244951 A1 | * | 10/2007 | Gressel | ................. H04L 9/0668 |
| | | | | 708/252 |

(Continued)

FOREIGN PATENT DOCUMENTS

| CN | 103136109 | 6/2016 |
|---|---|---|
| WO | WO 2014055445 A1 | 4/2014 |

OTHER PUBLICATIONS

Hu et al., "PUD-LRU: An Erase-Efficient Write Buffer Management Algorithm for Flash Memory SSD", 2010 18th Annual IEEE/ACM International Symposium on Modeling, Analysis and Simulation of Computer and Telecommunication Systems, Aug. 2010, pp. 69-78.

(Continued)

*Primary Examiner* — Tasnima Matin
(74) *Attorney, Agent, or Firm* — Tutunjian & Bitetto, P.C.; Randall Bluestone

(57) ABSTRACT

A device compresses a mapping table in a flash translation layer of a SSD. The mapping table includes mappings between Logical Page Numbers (LPNs) and Physical Page Numbers (PPNs). A base PPN table stores at least one entry including a base PPN common to multiple LPNs. A PPN offset table stores an offset for each mapping. A set of hash functions are duplicated for each entry in the base PPN table. A bit extension unit adds bits to the respective offset in the (Continued)

PPN offset table to provide an extended offset bit. A hash calculator calculates a hash value using the base PPN and one of the hash functions corresponding to the base PPN. An exclusive OR unit outputs a new PNN for each of different LPNs, including the multiple LPNs, by applying an exclusive OR operation to the hash value and the extended offset bit.

20 Claims, 10 Drawing Sheets

(56) References Cited

U.S. PATENT DOCUMENTS

| | | | | |
|---|---|---|---|---|
| 2016/0041905 | A1* | 2/2016 | Turner | G06F 12/0802 |
| | | | | 711/3 |
| 2017/0315927 | A1* | 11/2017 | Loh | G06F 12/1009 |
| 2017/0364446 | A1* | 12/2017 | Pham | G06F 12/1009 |
| 2019/0227947 | A1* | 7/2019 | Keppel | G06F 12/1009 |
| 2020/0310665 | A1* | 10/2020 | Hansen | G06F 3/0637 |

OTHER PUBLICATIONS

Lee et al., "µ-FTL: A Memory-Efficient Flash Translation Layer Supporting Multiple Mapping Granularities", EMSOFT'08, Oct. 2008, pp. 21-30.

Zhou et al., "An Efficient Page-level FTL to Optimize Address Translation in Flash Memory", EuroSys'15, Apr. 2015, pp. 1-16.

\* cited by examiner

COMPRESSION FOR FLASH TRANSLATION LAYER

BACKGROUND

The present invention generally relates to memory devices, and more particularly to compression for a flash translation layer.

Solid State Drives (SSDs) have become the mainstream storage device due to their high power efficiency and performance. However, the flash memory inside SSDs has a limitation in the number of write operations. Also, the flash memory cannot be overwritten before erasing any existing data. To hide these features from software, Flash Translation Layers (FTL) have been introduced inside SSDs. An FTL receives a logical address (i.e., a Logical Page Number) from the Operating System (OS) and maps the logical address to a physical address (i.e., a Physical Page Number) of the flash memory.

As the SSD capacity becomes larger, the mapping size of the FTL table also becomes larger. A large FTL mapping table reduces an amount of available Dynamic Random Access Memory (DRAM), as well as decreases power efficiency and performance. However, the use of a simple compression method for the FTL mapping may nonetheless adversely affect the performance and lifetime of the flash memory. In particular, a simple compression method may reduce the efficiency of wear leveling, which makes the number of writes for each flash page even, to increase the lifetime of flash memory. Thus, an improved compression approach is need for a flash translation layer.

SUMMARY

According to an aspect of the present invention, a compression device is provided for compressing a mapping table in a flash translation layer of a solid state drive. The mapping table includes mappings between Logical Page Numbers (LPNs) and Physical Page Numbers (PPNs). The compression device includes a base PPN table storing at least one entry which includes a base PPN that is common to a plurality of the LPNs. The compression device further includes a PPN offset table storing a respective offset for each of the mappings. The compression device also includes a set of hash functions duplicated for each of the at least one entry in the base PPN table. The compression device additionally includes a bit extension unit which adds one or more bits to the respective offset in the PPN offset table to provide an extended offset bit. The compression device further includes a hash calculator for calculating a hash value by using the base PPN and one of the hash functions corresponding to the base PPN. The compression device also includes an exclusive OR unit for outputting a new PNN for each of different pluralities, including the plurality, of the LPNs by applying an exclusive OR operation to the hash value and the extended offset bit.

According to another aspect of the present invention, a computer-implemented method is provided for compressing a mapping table in a flash translation layer of a solid state drive. The mapping table includes mappings between Logical Page Numbers (LPNs) and Physical Page Numbers (PPNs). The method includes storing, in a base PPN table, at least one entry which includes a base PPN that is mapped to a plurality of the LPNs. The method further includes storing, in a PPN offset table, a respective offset for each of the mappings. The method also includes providing a set of hash functions duplicated for each of the at least one entry in the base PPN table. The method additionally includes adding, by a bit extension unit, one or more bits to an offset value bit in the PPN offset table to provide an extended offset bit. The method further includes calculating, by a hash calculator, a hash value by using the base PPN and one of the hash functions corresponding to the base PPN. The method also includes outputting, by an exclusive OR unit, a new PNN for each of different pluralities, including the plurality, of the LPNs by applying an exclusive OR operation to the hash value and the extended offset bit.

According to yet another aspect of the present invention, a computer program product is provided for compressing a mapping table in a flash translation layer of a solid state drive. The mapping table includes mappings between Logical Page Numbers (LPNs) and Physical Page Numbers (PPNs). The computer program product includes a non-transitory computer readable storage medium having program instructions embodied therewith. The program instructions are executable by a computer to cause the computer to perform a method. The method includes storing, in a base PPN table, at least one entry which includes a base PPN that is mapped to a plurality of the LPNs. The method further includes storing, in a PPN offset table, a respective offset for each of the mappings. The method also includes providing a set of hash functions duplicated for each of the at least one entry in the base PPN table. The method additionally includes adding, by a bit extension unit, one or more bits to an offset value bit in the PPN offset table to provide an extended offset bit. The method further includes calculating, by a hash calculator, a hash value by using the base PPN and one of the hash functions corresponding to the base PPN. The method also includes outputting, by an exclusive OR unit, a new PNN for each of different pluralities, including the plurality, of the LPNs by applying an exclusive OR operation to the hash value and the extended offset bit.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to compression for a flash translation layer.

In an embodiment, the present invention uses hash functions for a base Physical Page Number (PPN) which is common to some (e.g., a subset of) Logical Page Numbers (LPNs).

In an embodiment, the present invention compresses a Flash Translation Layer (FTL) mapping table.

In an embodiment, the present invention uses all physical flash pages by using an appropriate hash function for flash memory.

Figure 1:
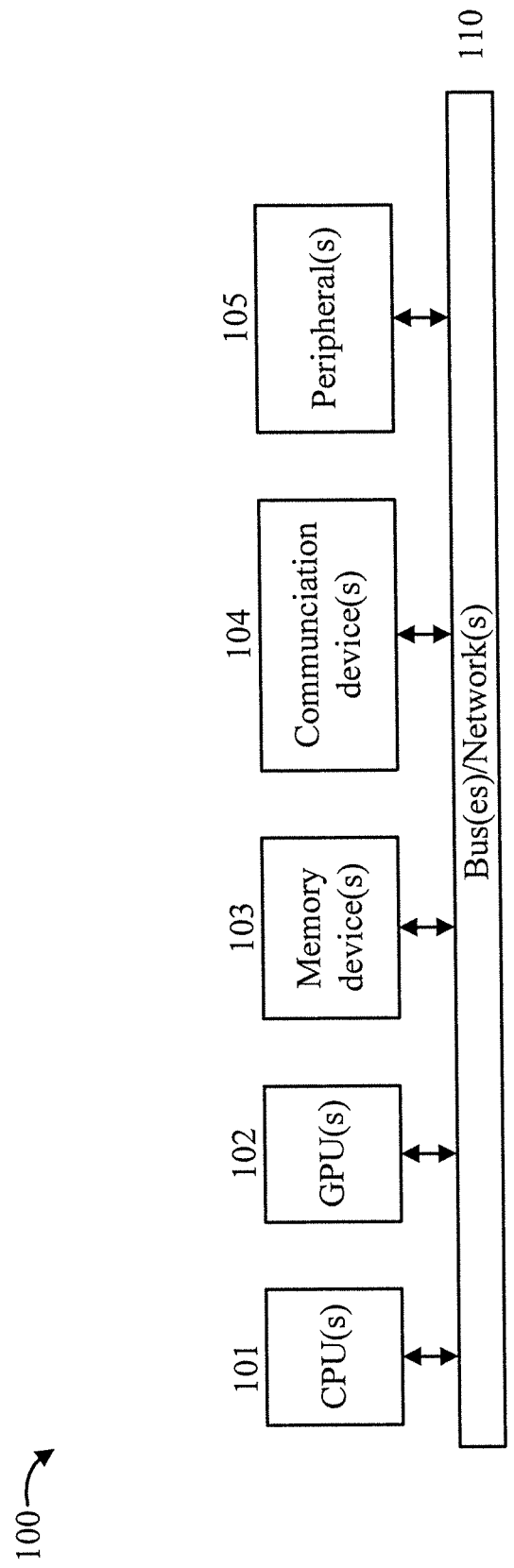
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
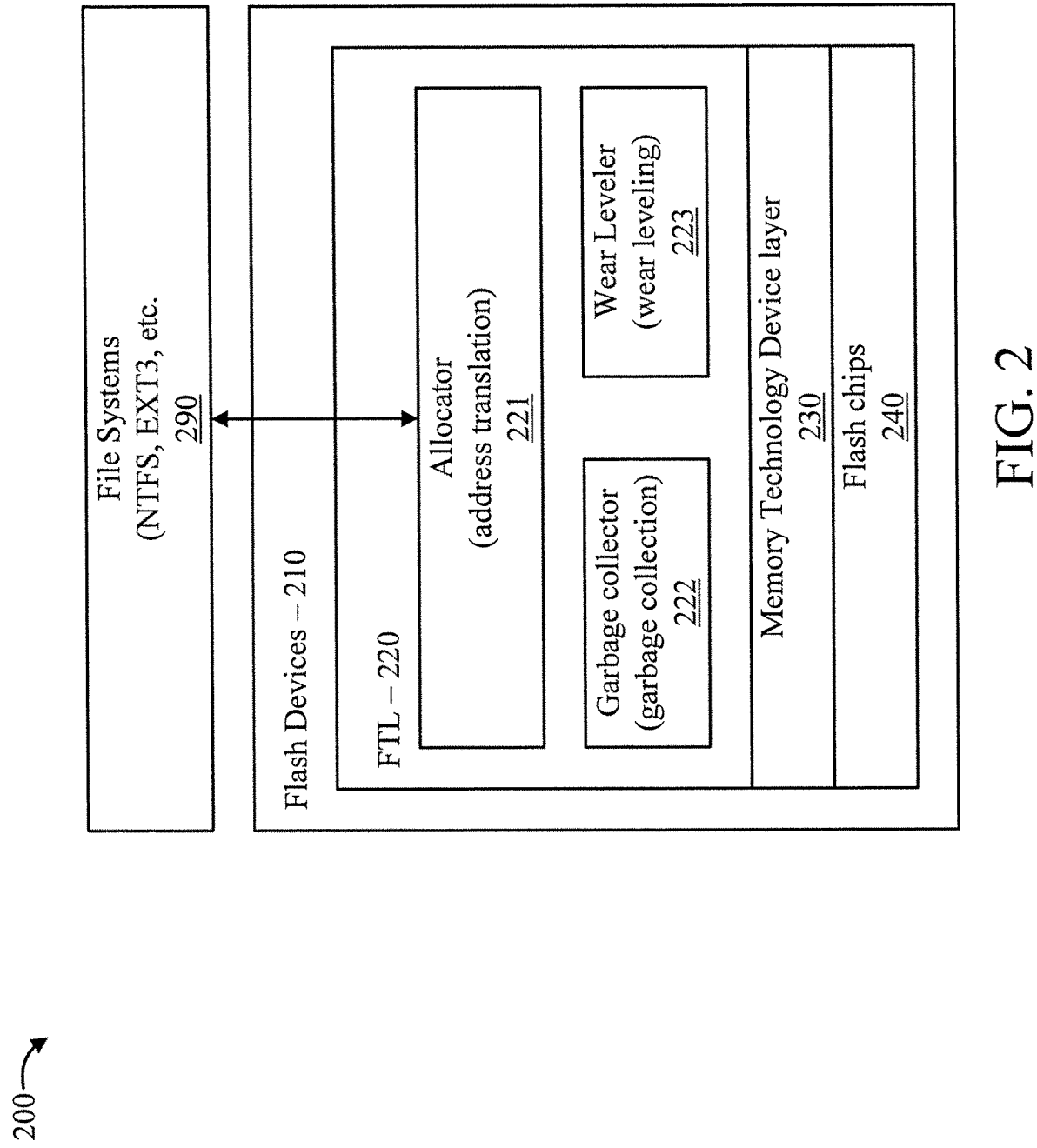
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention. In an embodiment, environment 200 can be considered as part of system 100 of FIG. 1.

The environment 200 includes flash devices 210 operatively coupled to file systems 290. The flash devices 210 include a flash translation layer 220, a memory technology device layer 230, and flash chips 240.

The flash translation layer 220 include an allocator 221, a garbage collector 222, and a wear leveler 223.

The allocator 221 allocates a new Physical Page Number (PPN) for a Logical Page Number (LPN) from the Operating System (OS).

The garbage collector 222 erases physical blocks, which include a set of physical pages, when the number of free physical blocks, which have no valid data, becomes few (e.g., less than a threshold). In an embodiment, the primary method for garbage collection is erasing the block which has the larger number of invalidated data.

The wear leveler 223 erases physical blocks which have the smallest number erasures to maintain an even bias for erasures across the physical blocks. The wear leveler 223 runs frequently when a hot data, which is used by the host computer many times, is written in the same physical block continually.

In an embodiment, the present invention provides a compression method for a flash translation layer (FTL), wherein the method allocates a new Physical Page Number (PPN) of flash memory for each Logical Page Number (LPN) from an Operating System (OS).

This method can compress n (2<n<N) mapping entries into 2 entries, where N=bit length for each entry. The mapping table is indexed by LPN/n.

A set of 2 entries have a "Base PPN" which is common around compressed n mappings. There are offsets for each of the compressed n mappings.

When a read operation for a LPN comes from the OS, the FTL applies a hash function to the base PPN corresponding to the LPN. Then the original PPN is generated from the base PPN which the hash function is applied to and the offset corresponding to the LPN.

When a write operation for a LPN comes from the OS, the FTL allocates a new PPN for the LPN. This allocation is basically performed depending upon an allocator's algorithm, but an allocable area is limited to $\{f_x(\text{Base PPN}) \sim f_x(\text{Base PPN}) + 2^{(N/n)}\}$ for the compression. The offset for the LPN is calculated from the newly allocated PPN and the base PPN, and it is stored in the corresponding mapping entry.

The operation to generate an original PPN from the base PPN and the offset should be commutative since it is used for both read and write. In an embodiment, the operation used is an exclusive OR. In other embodiments, other cumulative functions can be used.

Hash function for each offset generates allocable PPNs for each LPN. These PPNs for each LPN should be even for all PPNs to utilize all physical flash pages. In other words, the number of LPNs which can use one PPN should be the same between all PPNs. The example hash function is as follows:

$$f_x(\text{base PPN}) = \text{perm}(\text{base PPN} + x)$$

where
 x: offset number {0, . . . , n},
 perm: permutate each bit in an arbitrary order.

A description will now be given regarding a desired property of a hash function that is to be used by the present invention, in accordance with one or more embodiments of the present invention.

It is to be appreciated that the present invention cannot utilize all pages if hash values are not uniformly distributed.

A block b stores data if and only if the hash function for the data store generates bB, where B is the number of pages in a block.

If hash value bB is generated not exactly B times when all the base values are supplied to all the hash functions, the number of maps between the FTL and the block b is not exactly B.

Figure 3:
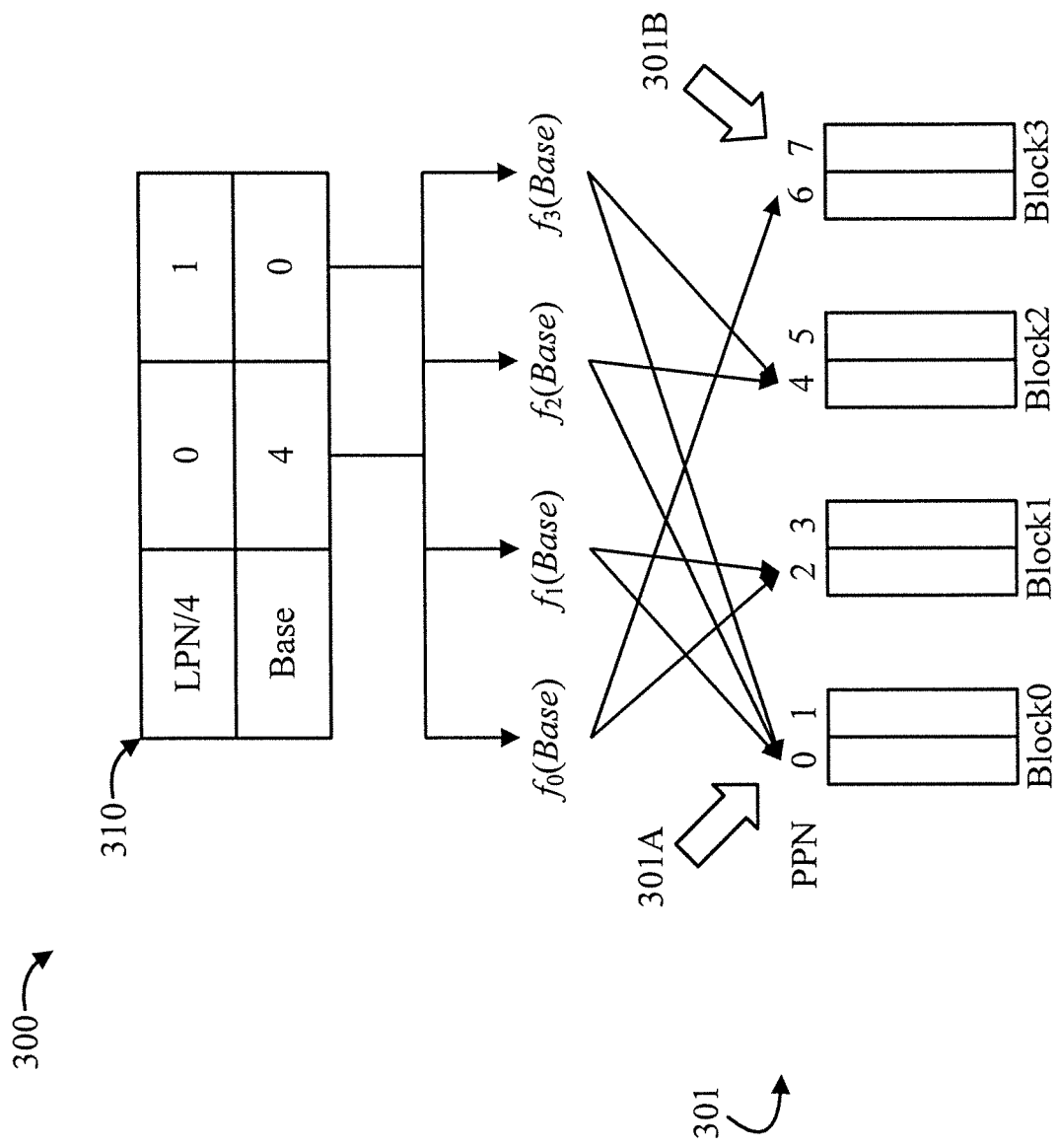
FIG. 3 is a diagram showing mappings with detrimental effects to which the present invention can be applied, in accordance with an embodiment of the present invention.

In this case, the SSD cannot fully utilize all the pages because of the following reasons as shown in FIG. 3. FIG. 3 is a diagram showing mappings 300 with detrimental effects 301 to which the present invention can be applied, in accordance with an embodiment of the present invention. In particular, FIG. 3 shows as the detrimental effects 301: (1) an offset table having an unusable area 301A, due to three mappings; and (2) a block (i.e., Block3) having an unusable page 301B, due to only one (i.e., single) mapping. In FIG. 3, a base PPN table 310 has a top row denoting values for LPN/n (where n=4), and a bottom row denoting values for the base. The base PPN table 310 includes at least one entry (here, two)) which, in turn, includes a base PPN that corresponds to multiple LPNs. Here, the base PPN table 310 includes two entries, one for a base value of 4 and another with a base value of 0. Four blocks are shown, namely Block0, Block1, Block2, and Block3. Each of the blocks (i.e., 0-4) has two physical pages. Thus, Block0 has PPNs 0 and 1, Block1 has PPNs 2 and 3, Block2 has PPNs 4 and 5, and Block3 has PPNs 6 and 7. Hash function $f_0$(Base) maps to Blocks1 and 3, hash function $f_1$(Base) maps to Blocks0 and 1, hash function $f_2$(Base) maps to Blocks 0 and 2, and hash function $f_3$(Base) maps to Blocks 0 and 2.

If the number of mappings is larger than B: There is(are) unusable area(s) 301A in the offset table because the block cannot store data anymore after the pages of the block are fully occupied.

If the number of mappings is less than B: There is(are) unusable pages(s) 301B in the block even after the offset table is fully filled.

The above property is preserved in all other blocks. Thus, as the desired property of a hash function used by the present invention, the number of maps between the FTL and a block generated by the hash function should be exactly B.

Figure 4:
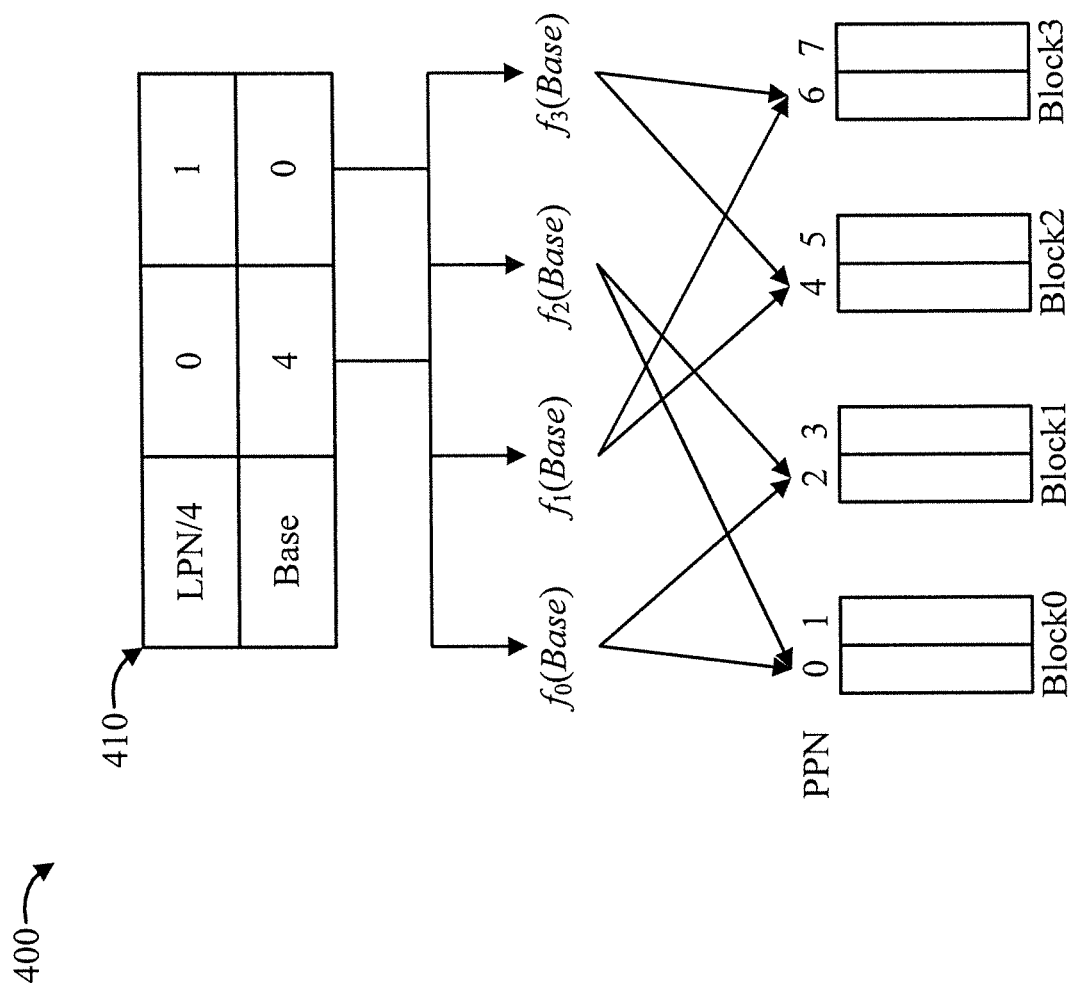
FIG. 4 is a diagram showing exemplary mappings without detrimental effects, in accordance with an embodiment of the present invention.
Figure 5:
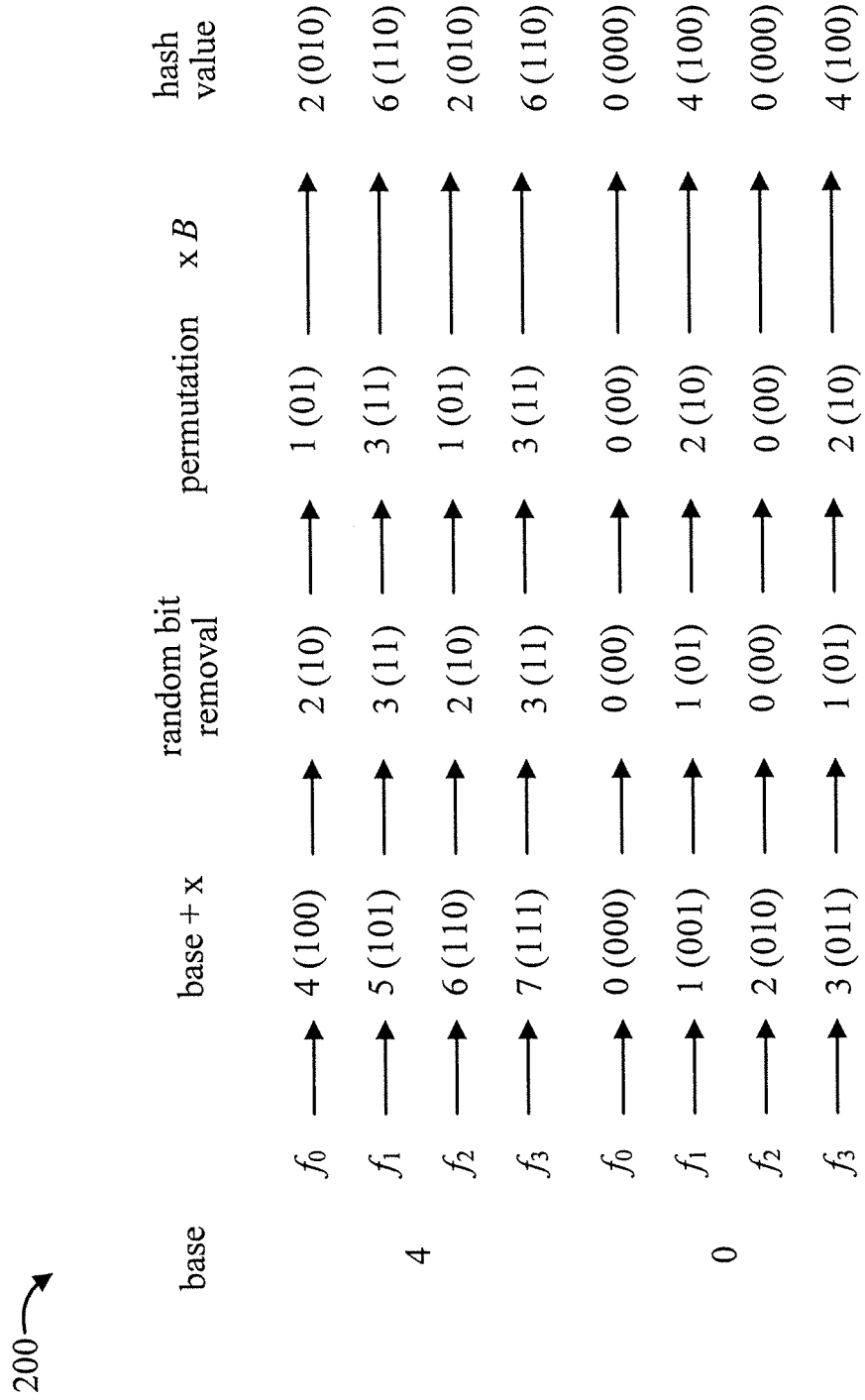
FIG. 5 is a diagram showing an exemplary hash function example, in accordance with an embodiment of the present invention.

A description will now be given of an exemplary hash function, in accordance with an embodiment of the present invention. The description will be given relative to FIGS. 4 and 5. FIG. 4 is a diagram showing exemplary mappings 400 without detrimental effects, in accordance with an embodiment of the present invention. FIG. 5 is a diagram showing an exemplary hash function example 500 to which the present invention can be applied, in accordance with an embodiment of the present invention.

The following designations apply:
n is the number of elements (columns) in a row of the offset table;
P is the number of pages (P is a multiple of n); and
B is the number of pages in a block.

The bit width of a base value is $\log_2 (P)$.

The following procedure generates base values and hash functions that provide the desirable hash function property described herein (i.e., that the number of maps between a FTL and a block generated by the hash functions is exactly B).

Each of base values between 0 and P−n appears exactly once in an FTL where a base value is a multiple of n.
$f_x$(base)=perm(base+x)×B
perm is a function that removes a predetermined $\log_2 (P) - \log_2 (P/B)$ bits from the bit sequence of base, and then permutates the bit sequence in a predetermined order.

All of the hash functions $f_x$ (0≤x≤n−1) use the same perm.

The property can be preserved when the mechanism swaps a base value with the base value in another row of the base PPN table 410. Garbage Collection (GC) and wear leveling can utilize this swap technique to move data to other blocks while preserving the property.

Figure 6:
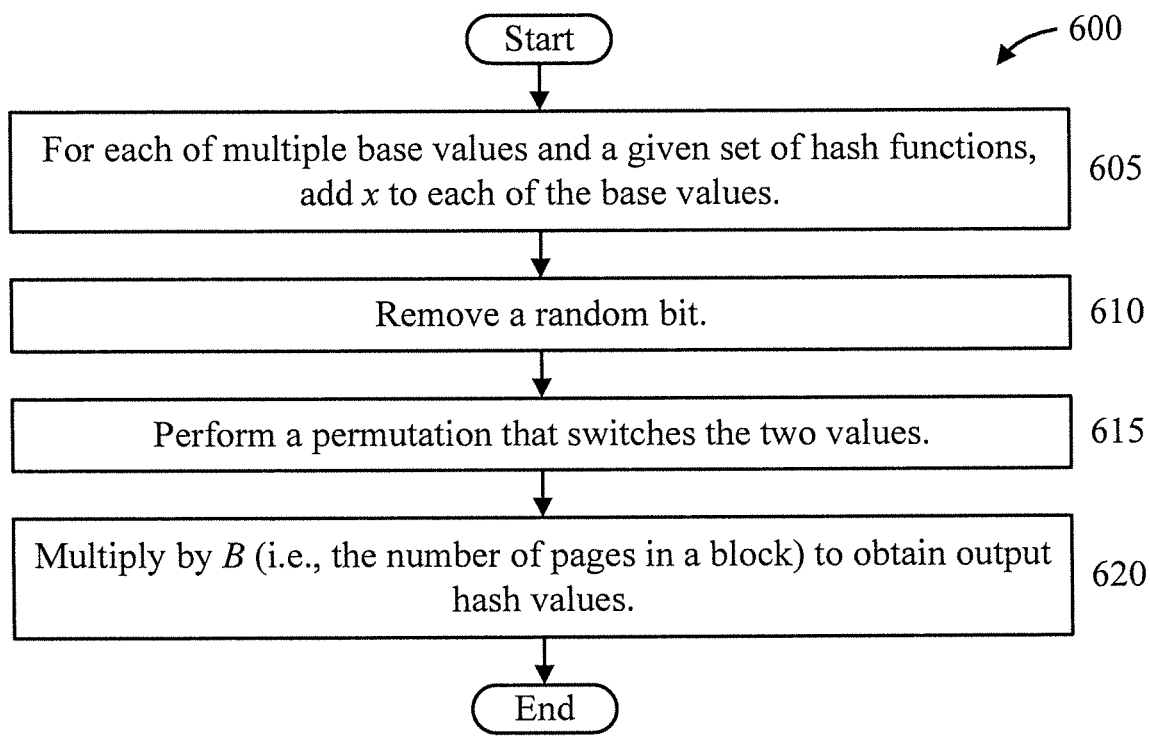
FIG. 6 is a block diagram showing an exemplary method for compression mapping tables between a logical page number and a physical page number, in accordance with an embodiment of the present invention.

FIG. 6 is a block diagram showing an exemplary method 600 for compression mapping tables between a logical page number and a physical page number, in accordance with an embodiment of the present invention.

At block 605, for each of multiple base values and a given set of hash functions, add x to each of the base values. The variable x is an integer starting from 1, and is incremented for each of the hash functions. Thus, for a base of 4 and for $f_0, f_1, f_2$, and $f_3$, the following values are output from block 405: 4(100); 5(101); 6(110); and 7(111). For a base of 0 and for $f_0, f_1, f_2$, and $f_3$, the following values are output from block 605: 0(000); 1(001); 2(010); and 3(011).

At block 610, remove a random bit. For the sake of illustration, the second bit removed. Thus, the following is output from block 610, corresponding to the bases of 4 and 0, respectively: {2(10); 3(11); 2(10); 3(11)} and {0(00); 1(01); 0(00); 1(01)}.

At block 615, perform a permutation that switches the two values. Thus, the following is output from block 615, corresponding to the bases of 4 and 0, respectively: {1(01); 3(11); 1(01); 3(11)} and {0(00); 2(10); 0(00); 2(10)}.

At block 620, multiply by B (i.e., the number of pages in a block) to obtain output hash values. Thus, the following is output from block 620, corresponding to the bases of 4 and 0, respectively: {2(010); 6(110); 2(010); 6(110)} and {0(000); 4(100); 0(000); 4(100)}.

As is evident from the results obtained at block 620, the values of 0, 2, 4, and 6 each appear exactly twice.

A description will now be given of exemplary compressions, in accordance with an embodiment of the present invention. The descriptions are given relative to FIGS. 7-9.

The present invention can reduce the Flash Translation Layer (FTL) mapping table by compressing the FTL table. In doing so, garbage collection may increase, but the increased cost is significantly overshadowed by the decrease in the size of the FTL mapping table.

The present invention can use all flash pages by using appropriate hash functions. The hash functions scatter the allocable area of PPNs for each LPN. Scatting PPNs can increase read/write throughput for the SSD, and can utilize channel parallelism.

The allocable area for each LPN is as follows:
LPN0: 000-001 (PPN: 0-1);
LPN1: 100-101 (PPN: 4-5);
LPN2: 010-011 (PPN: 2-3); and
LPN3: 110-111 (PPN: 6-7).

Figure 7:
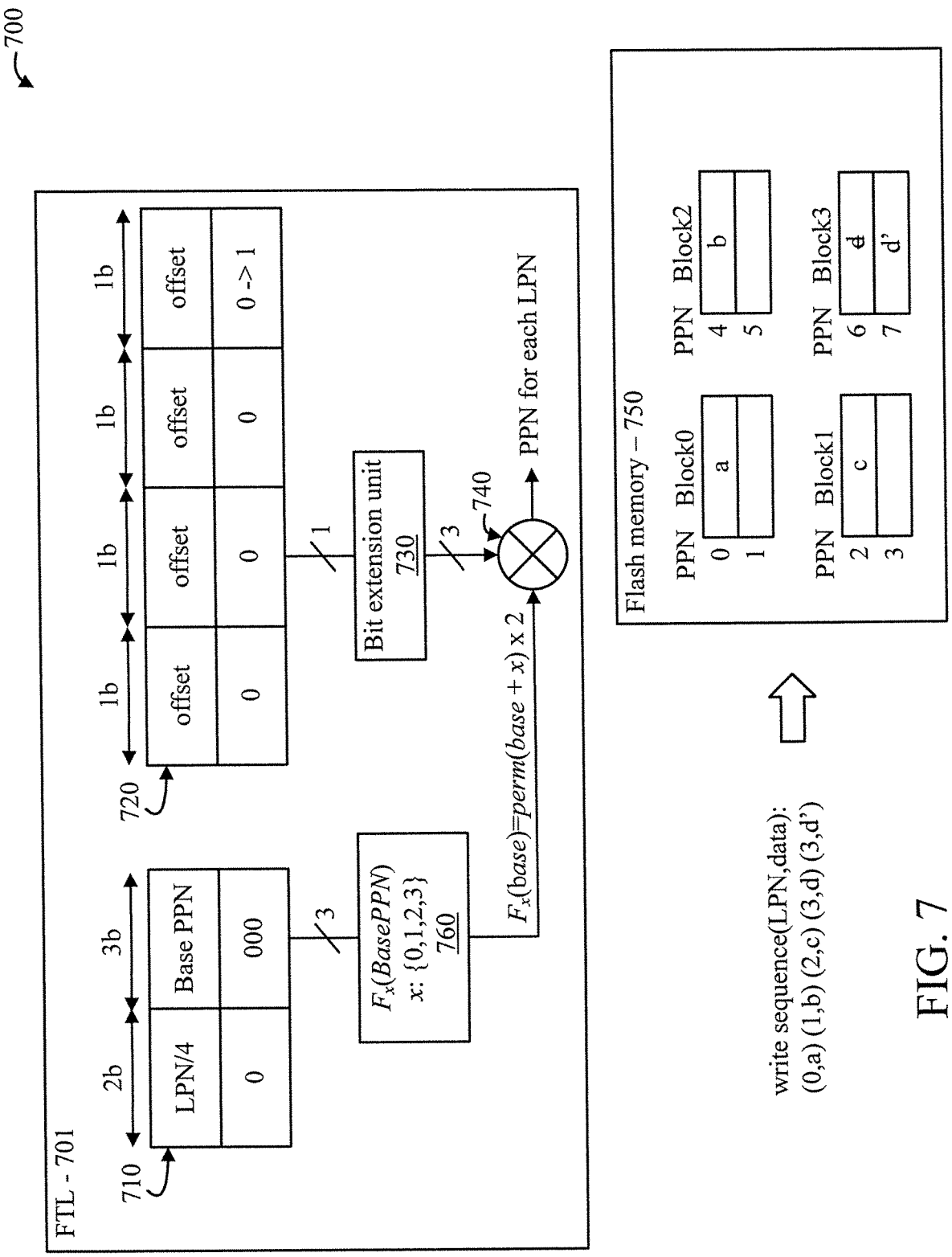
FIG. 7 is a diagram showing an exemplary compression example, in accordance with an embodiment of the present invention.

FIG. 7 is a diagram showing an exemplary compression example 700, in accordance with an embodiment of the present invention. The compression example 700 is for the following write sequence (LPN, data): (0,a) (1,b) (2,c) (3,d) (3,d').

The compression example 700 involves a FTL 701, a base PPN table 710, an offset table 720, a bit extension unit 730, an exclusive OR (XOR) 740, a flash memory 750, and a hash calculator 760. The bit extension unit 730, similar to units 830 and 930, only adds additional zeros to the input. Since the bid width of the offset table is limited, the width of each offset in the offset table and that of the base PPN is different (e.g., 3 bit base PPN and 1 bit offset in FIG. 8). The output of hash function (fx(base PPN)) is also 3 bit). To get a real PPN value, an exclusive OR operation should be performed for the hashed base PPN and a related offset value. Also, the exclusive OR operation can be done for two values which has the same bit width. Thus, the bit extension unit simply adds additional zeros to high-order bits of the offset value.

The flash memory 750 includes Blocks0-4, each having 2 pages (B=2). Thus, Block0 includes PPNs 0 and 1, Block1 includes PPNs 2 and 3, Block2 includes PPNs 4 and 5, and Block3 includes PPNs 6 and 7.

Figure 8:
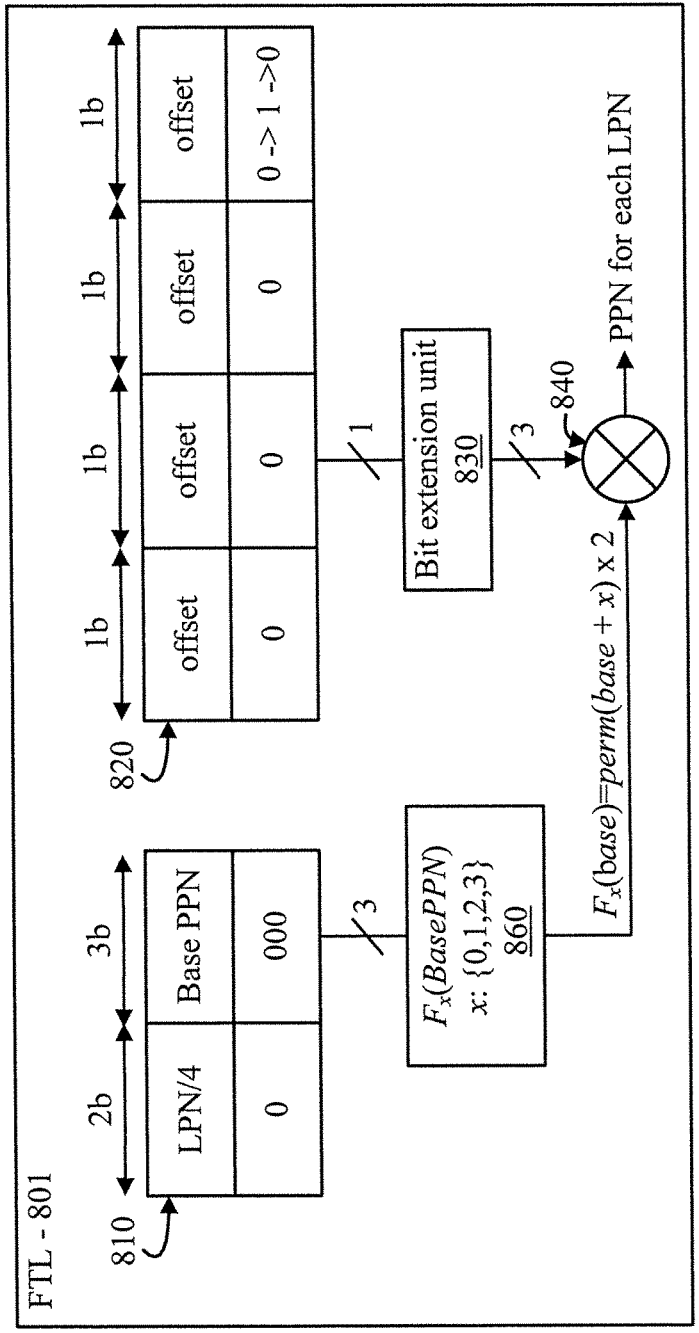
FIG. 8 is a diagram showing another exemplary compression example, in accordance with an embodiment of the present invention.
Figure 8:
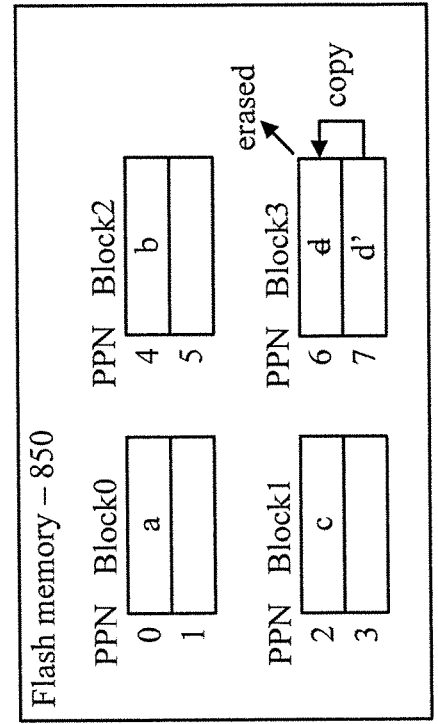

FIG. 8 is a diagram showing another exemplary compression example 800, in accordance with an embodiment of the present invention. The compression example 800 is for the following write sequence (LPN, data): (0,a) (1,b) (2,c) (3,d) (3,d') (GC: Block2).

The compression example 800 involves a FTL 801, a base PPN table 810, an offset table 820, a bit extension unit 830, an exclusive OR (XOR) 840, a flash memory 850, and a hash calculator 860.

The flash memory 850 includes Blocks0-4, each having 2 pages (B=2). Thus, Block0 includes PPNs 0 and 1, Block1 includes PPNs 2 and 3, Block2 includes PPNs 4 and 5, and Block3 includes PPNs 6 and 7.

Figure 9:
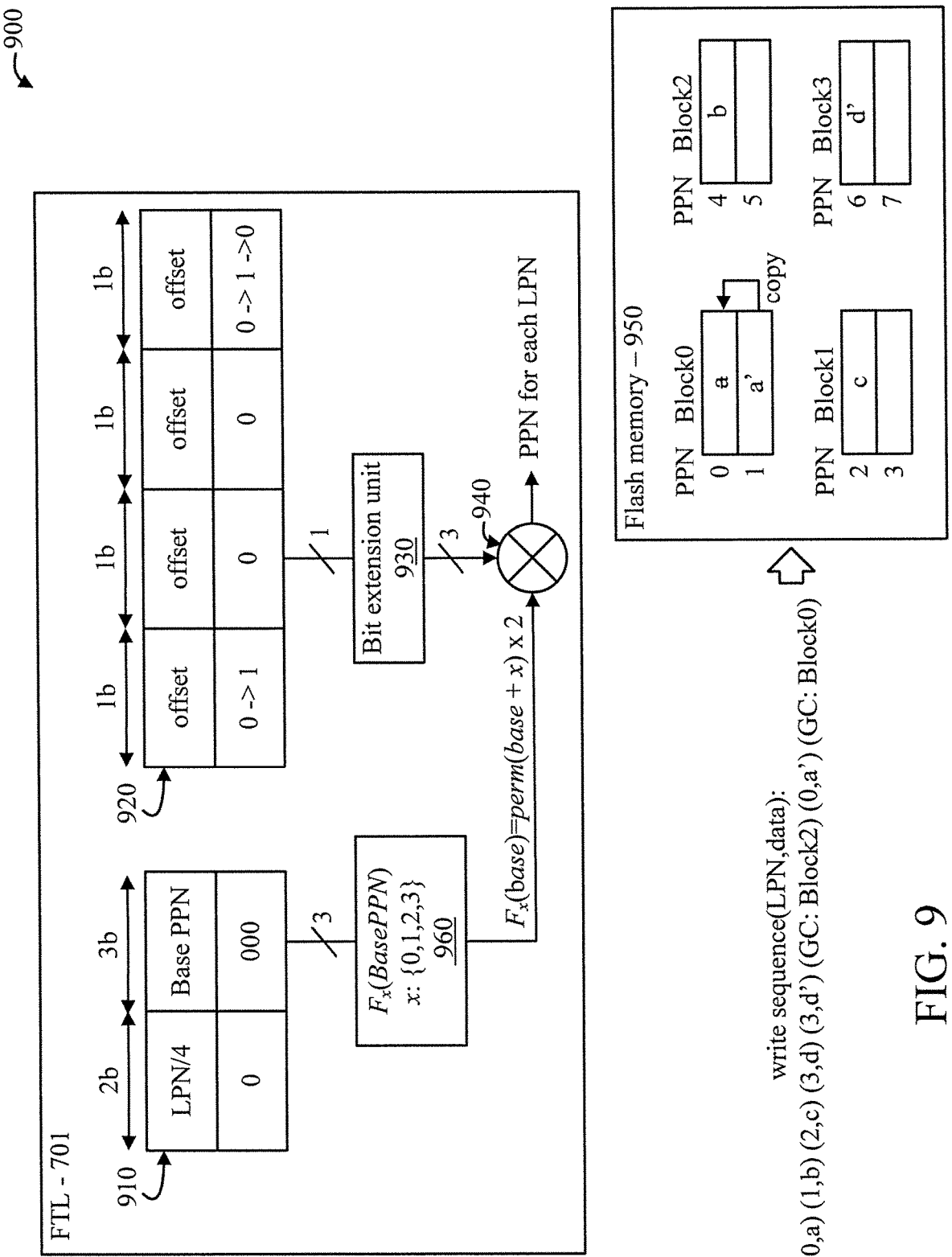
FIG. 9 is a diagram showing yet another exemplary compression example, in accordance with an embodiment of the present invention.

FIG. 9 is a diagram showing yet another exemplary compression example 900, in accordance with an embodiment of the present invention. The compression example 900 is for the following write sequence (LPN, data): (0,a) (1,b) (2,c) (3,d) (3,d') (GC: Block2) (0,a') (GC: Block0).

The compression example 900 involves a FTL 901, a base PPN table 910, an offset table 920, a bit extension unit 930, an exclusive OR (XOR) 940, a flash memory 950, and a hash calculator 960.

The flash memory 950 includes Blocks0-4, each having 2 pages (B=2). Thus, Block0 includes PPNs 0 and 1, Block1 includes PPNs 2 and 3, Block2 includes PPNs 4 and 5, and Block3 includes PPNs 6 and 7.

Figure 10:
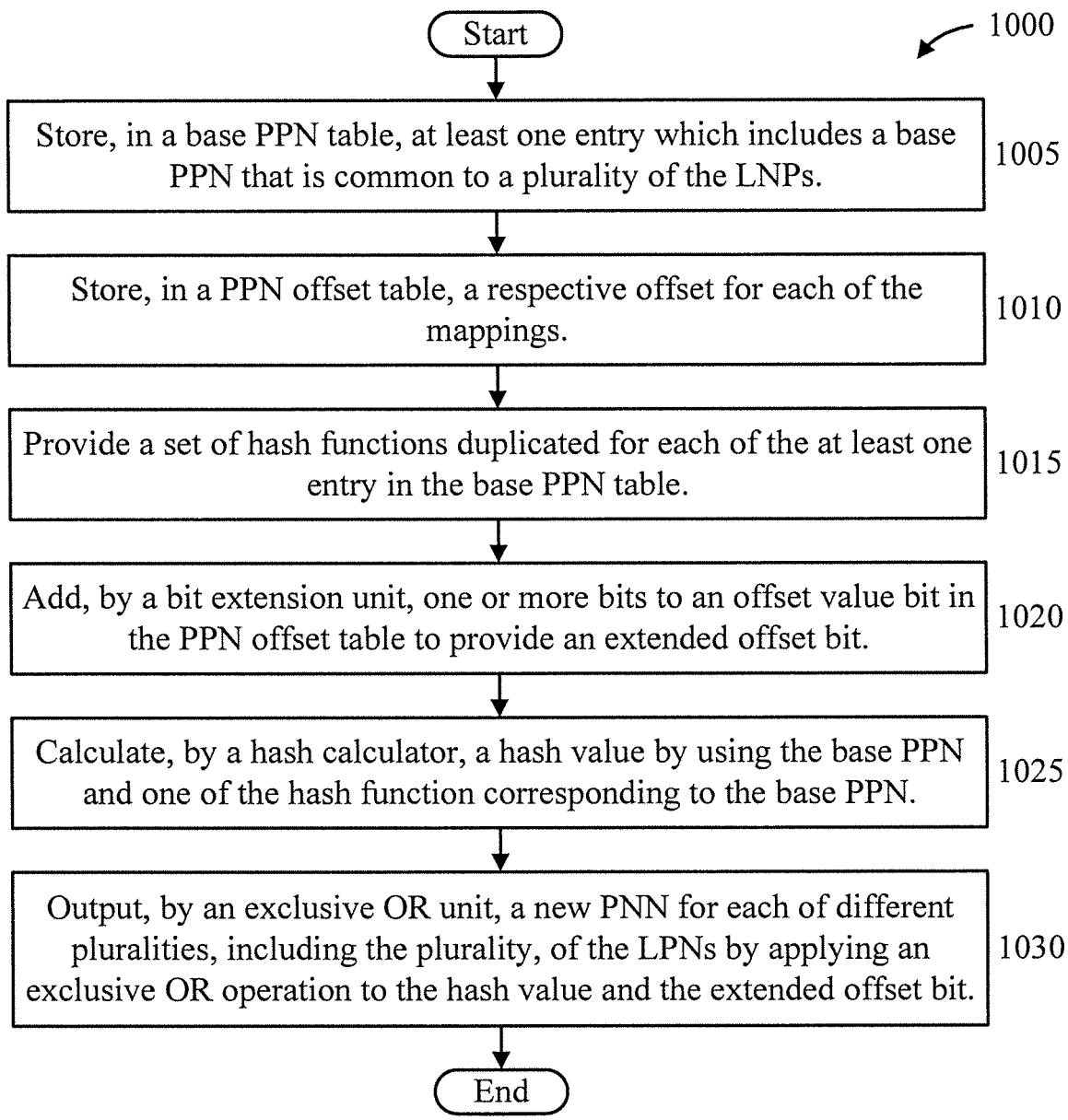
FIG. 10 is a flow diagram showing an exemplary method for Flash Translation Layer (FTL) compression, in accordance with an embodiment of the present invention.

FIG. 10 is a flow diagram showing an exemplary method 1000 for Flash Translation Layer (FTL) compression, in accordance with an embodiment of the present invention.

At block 1005, store, in a base PPN table, at least one entry which includes a base PPN that is common to a plurality of the LPNs.

At block 1010, store, in a PPN offset table, a respective offset for each of the mappings.

At block 1015, provide a set of hash functions duplicated for each of the at least one entry in the base PPN table.

At block 1020, add, by a bit extension unit, one or more bits to an offset value bit in the PPN offset table to provide an extended offset bit.

At block 1025, calculate, by a hash calculator, a hash value by using the base PPN and one of the hash function corresponding to the base PPN.

At block 1030, output, by an exclusive OR unit, a new PNN for each of different pluralities, including the plurality, of the LPNs by applying an exclusive OR operation to the hash value and the extended offset bit. It is to be appreciated that the mappings between the LPNs and the PPNs are reduced by half by using the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A compression device for compressing a mapping table in a flash translation layer of a solid state drive, the mapping table comprising mappings between Logical Page Numbers (LPNs) and Physical Page Numbers (PPNs), the compression device comprising:
a base PPN table storing at least one entry which includes a base PPN that is common to a plurality of the LPNs;
a PPN offset table, separate from the base PPN table, storing a respective offset for each of the mappings;
a set of hash functions duplicated for each of the at least one entry in the base PPN table;
a bit extension unit, operatively coupled to the PPN offset table, which adds one or more bits to the respective offset in the PPN offset table to provide an extended offset bit;
a hash calculator, operatively coupled to the base PPN table, calculating a hash value by using the base PPN and one of the hash functions corresponding to the base PPN; and
an exclusive OR unit, operatively coupled to the bit extension unit and the hash calculator, outputting a new PNN for each of different pluralities, including the plurality, of the LPNs by applying an exclusive OR operation to the hash value and the extended offset bit.

2. The compression device of claim 1, wherein each of the hash functions in the set removes a random bit from a sum of the base PPN and an integer value, and switches a bit order of the sum.

3. The compression device of claim 1, wherein the set of hash functions scatters an allocable area of the PPNs for each of the LPNs to avoid mapping conflicts.

4. The compression device of claim 1, wherein the set of hash functions comprise a common permutation there between.

5. The compression device of claim 1, wherein the common permutation comprises is arbitrarily selected but consistently applied across the set of hash function.

6. The compression device of claim 1, wherein the respective offset is between the base PPN and the respective new one of the PNNs.

7. The compression device of claim 1, wherein a number of LPNs capable of using one of the PPNs is identical between all of the PPNs.

8. The compression device of claim 1, wherein the set of hash functions comprise adding hardware and fixed bit permutation hardware for implementing the set of hash functions.

9. A computer-implemented method for compressing a mapping table in a flash translation layer of a solid state drive, the mapping table comprising mappings between Logical Page Numbers (LPNs) and Physical Page Numbers (PPNs), the compression method comprising:
 storing, in a base PPN table, at least one entry which includes a base PPN that is mapped to a plurality of the LPNs;
 storing, in a PPN offset table separate from the base PPN table, a respective offset for each of the mappings;
 providing a set of hash functions duplicated for each of the at least one entry in the base PPN table;
 adding, by a bit extension unit operatively coupled to the PPN offset table, one or more bits to an offset value bit in the PPN offset table to provide an extended offset bit;
 calculating, by a hash calculator operatively coupled to the base PPN table, a hash value by using the base PPN and one of the hash functions corresponding to the base PPN, and
 outputting, by an exclusive OR unit operatively coupled to the bit extension unit and the hash calculator, a new PNN for each of different pluralities, including the plurality, of the LPNs by applying an exclusive OR operation to the hash value and the extended offset bit.

10. The computer-implemented method of claim 9, wherein the method is performed responsive to a data read request for the solid state drive.

11. The computer-implemented method of claim 9, wherein the method is biased to using all available flash pages over less than all of the available flash pages.

12. The computer-implemented method of claim 9, wherein each of the hash functions in the set removes a random bit from a sum of the base PPN and an integer value, and switches a bit order of the sum.

13. The computer-implemented method of claim 9, wherein the set of hash functions scatters an allocable area of the PPNs for each of the LPNs to avoid mapping conflicts.

14. The computer-implemented method of claim 9, wherein the set of hash functions comprise a common permutation there between.

15. The computer-implemented method of claim 9, wherein the common permutation is arbitrarily selected but consistently applied across the set of hash functions.

16. The computer-implemented method of claim 9, wherein the respective offset is between the base PPN and the respective new one of the PNNs.

17. The computer-implemented method of claim 9, wherein a number of LPNs capable of using one of the PPNs is identical between all of the PPNs.

18. The computer-implemented method of claim 9, wherein the set of hash functions comprise adding hardware and fixed bit permutation hardware for implementing the set of hash functions.

19. A computer program product for compressing a mapping table in a flash translation layer of a solid state drive, the mapping table comprising mappings between Logical Page Numbers (LPNs) and Physical Page Numbers (PPNs), the computer program product comprising a non-transitory computer readable storage medium having program instructions embodied therewith, the program instructions executable by a computer to cause the computer to perform a method comprising:
 storing, in a base PPN table, at least one entry which includes a base PPN that is mapped to a plurality of the LPNs;
 storing, in a PPN offset table separate from the base PPN table, a respective offset for each of the mappings;
 providing a set of hash functions duplicated for each of the at least one entry in the base PPN table;
 adding, by a bit extension unit operatively coupled to the PPN offset table, one or more bits to an offset value bit in the PPN offset table to provide an extended offset bit;
 calculating, by a hash calculator operatively coupled to the base PPN table, a hash value by using the base PPN and one of the hash functions corresponding to the base PPN, and outputting, by an exclusive OR unit operatively coupled to the bit extension unit and the hash calculator, a new PNN for each of different pluralities, including the plurality, of the LPNs by applying an exclusive OR operation to the hash value and the extended offset bit.

20. The computer program product of claim 19, wherein each of the hash functions in the set removes a random bit from a sum of the base PPN and an integer value, and switches a bit order of the sum.

* * * * *